United States Patent
Kubota et al.

(10) Patent No.: US 7,315,327 B2
(45) Date of Patent: Jan. 1, 2008

(54) IMAGING ELEMENT, IMAGING DEVICE, AND METHOD OF DETERRING MISAPPROPRIATION OF IMAGING ELEMENT

(75) Inventors: Koji Kubota, Saitama-ken (JP); Naoki Kubo, Saitama-ken (JP)

(73) Assignee: Fujifilm Corporation, Tokyo (JP)

(*) Notice: Subject to any disclaimer, the term of this patent is extended or adjusted under 35 U.S.C. 154(b) by 794 days.

(21) Appl. No.: 10/448,294

(22) Filed: May 30, 2003

(65) Prior Publication Data

US 2003/0223004 A1 Dec. 4, 2003

(30) Foreign Application Priority Data

Jun. 3, 2002 (JP) .............................. 2002-161683

(51) Int. Cl.
*H04N 5/217* (2006.01)
*H04N 9/64* (2006.01)

(52) U.S. Cl. ........................................ 348/241; 348/243
(58) Field of Classification Search ......... 348/241–251
See application file for complete search history.

(56) References Cited

U.S. PATENT DOCUMENTS 5,455,624 A * 10/1995 Ishibe et al. ................. 348/340
5,521,639 A * 5/1996 Tomura et al. ............... 348/243
6,744,526 B2 * 6/2004 McDermott et al. ........ 358/1.11
2001/0055068 A1 * 12/2001 Funakoshi et al. ........... 348/243

FOREIGN PATENT DOCUMENTS

| JP | 7-131721 | 5/1995 |
|----|----------|--------|
| JP | 2000-165720 | 6/2000 |
| JP | 2000-224487 | 8/2000 |
| JP | 2002-77739 | 3/2002 |

* cited by examiner

*Primary Examiner*—David Ometz
*Assistant Examiner*—Tuan Le
(74) *Attorney, Agent, or Firm*—McGinn IP Law Group, PLLC

(57) ABSTRACT

The present invention provides an imaging element that can prevent misappropriation by a third party, an imaging device disposed with the imaging element, and a method of deterring misappropriation of the imaging element. In a CCD (imaging element) disposed with plural photodiodes for breaking down an image into plural pixels to generate image information representing the image and an OB portion (optical black portion) that shields a partial region of a light-receiving region corresponding to the plural photodiodes in order to determine an output level when the image is black, an opening for guiding light to the photodiodes is disposed at a predetermined position in the OB portion.

17 Claims, 5 Drawing Sheets

IMAGING ELEMENT, IMAGING DEVICE, AND METHOD OF DETERRING MISAPPROPRIATION OF IMAGING ELEMENT

BACKGROUND OF THE INVENTION

1. Field of the Invention

The present invention relates to an imaging element, an imaging device, and a method of deterring misappropriation of the imaging element. In particular, the invention relates to an imaging element disposed with plural photoelectric conversion elements for breaking down an image into plural pixels to generate image information representing the image and a shielding member that shields a partial region of a light-receiving region corresponding to the plural photoelectric conversion elements in order to determine an output level when the image is black, and to an imaging device using the imaging element.

2. Description of the Related Art

In recent years, the demand for digital cameras, such as digital still cameras and digital video cameras, has risen sharply in accompaniment with an increase in the resolution of imaging elements such as charge coupled devices (CCD) and complementary metal oxide semiconductors (CMOS) image sensor.

Among CCDs used in this type of digital camera, there are CCDs disposed with plural photoelectric conversion elements for breaking down an image (in this case, a subject image) into plural pixels to generate image information representing the image and a shielding member that shields a partial region of a light-receiving region corresponding to the plural photoelectric conversion elements in order to determine an output level when the image is black. The region shielded by the shielding member is usually called an optical black portion.

Digital cameras using this type of CCD set, on the basis of an output signal from the photoelectric conversion elements shielded by the shielding member, a level corresponding to black of an output signal from the photoelectric conversion elements not shielded by the shielding member, i.e., from the photoelectric conversion elements that output a signal representing an actual image. Thus, the phenomenon of smear, in which bright lines appear above and below a high-luminance portion in the image due to the scattering of incident light and the diffusion of photoelectrons generated within the CCD element, is corrected.

Assuming that a rental system, in which digital cameras housing a CCD disposed with an optical black portion are rented at a low fee to general users and recovered after use, will be constructed, there is a concern that the CCDs, which are relatively expensive, will be removed from the rented digital cameras by a third party and misappropriated.

SUMMARY OF THE INVENTION

The present invention was devised in light of the above facts. The invention provides an imaging element that can prevent misappropriation by a third party, and an imaging device that can prevent misappropriation of a housed imaging element.

According to one aspect of the invention, there is provided an imaging element comprising: plural photoelectric conversion elements for breaking down an image into plural pixels to generate image information representing the image; and a shielding member that shields a partial region of a light-receiving region corresponding to the plural photoelectric conversion elements in order to determine an output level when the image is black, wherein an opening for guiding light to the photoelectric conversion elements is disposed at a predetermined position in the shielding member.

According to the imaging element of the invention, an opening for guiding light to the photoelectric conversion elements is disposed at a predetermined position in the shielding member, which shields a partial region of a light-receiving region corresponding to the plural photoelectric conversion elements in order to determine an output level when the image is black. Here, the partial region is a region corresponding to the aforementioned optical black portion. It should be noted that photodiodes or phototransistors can be used as the photoelectric conversion elements.

That is, in the invention, by disposing the opening at the predetermined position in the shielding member, light is made incident at the portion of the photoelectric conversion elements positioned in the optical black portion that is ordinarily used on the assumption that it is shielded. In a state of ordinary use, the level of image information becomes remarkably high and is abnormal because the level of black is set on the basis of an output signal from the photoelectric conversion elements corresponding to the position at which the shielding member including the opening portion is disposed. As a result, misappropriation of the imaging element can be prevented.

It should be noted that, because the opening of the invention is disposed at a predetermined position in the shielding member, a regular user of the imaging element who knows of this position can prevent image information from becoming abnormal by using the imaging element so that the output signal from the photoelectric conversion elements corresponding to the position is not used to set the level of black.

In this manner, according to the imaging element of the invention, because the plural photoelectric conversion elements, which are for breaking down an image into plural pixels to generate image information representing the image, and the shielding member, which shields a partial region of a light-receiving region corresponding to the plural photoelectric conversion elements in order to determine an output level when the image is black, are disposed, and the opening for guiding light to the photoelectric conversion elements is disposed at the predetermined position in the shielding member, the image information whose level of black is set on the basis of the output signal from the photoelectric conversion elements in the state of ordinary use can be made abnormal and, as a result, misappropriation by a third party can be prevented.

According to another aspect of the invention, there is provided an imaging device comprising: the imaging element of the invention; a setting portion for setting, on the basis of an output signal from the photoelectric conversion elements corresponding to the partial region in the imaging element, a level of black of an output signal from the photoelectric conversion elements corresponding to another partial region excluding the partial region; and a prohibition portion that prohibits use by the setting portion of an output signal from the photoelectric conversion elements at which light is made incident via the opening disposed in the shielding member.

The imaging device of the invention is disposed with the imaging element of the invention, and the level of black of the output signal from the photoelectric conversion elements corresponding to the other partial region excluding the partial region, i.e., the photoelectric conversion elements outputting a signal representing an actual image, is set on the basis of the output signal from the photoelectric conversion elements corresponding to the partial region in the imaging element, i.e., the photoelectric conversion elements positioned in the optical black portion.

Use by the setting portion of the output signal from the photoelectric conversion elements at which light is made incident via the opening disposed in the shielding member of the imaging element is prohibited by the prohibition portion.

In the present invention, smear is corrected by the setting by the setting portion. However, as mentioned above, because the imaging element of the invention is disposed with the opening at the predetermined position in the shielding member, when the level of black of the image information is set on the basis of the output signal from the photoelectric conversion elements at which light is made incident via the opening, the level of the image information becomes remarkable high and abnormal.

Thus, in the invention, use by the setting portion of an output signal from the photoelectric conversion elements at which light is made incident via the opening disposed in the shielding member is prohibited by the prohibition portion, whereby the image information is prevented from becoming abnormal. Therefore, although the imaging element of the invention can be used in the imaging device of the invention without causing abnormality in the image information, when the imaging element is misappropriated and used in a state of ordinary use, abnormality is caused in the image information and, as a result, misappropriation of the imaging element can be prevented.

In this manner, the imaging device pertaining to the invention is disposed with the imaging element of the invention, and use of the output signal from the photoelectric conversion elements at which light is made incident via the opening disposed in the shielding member is prohibited when setting the level of black of the output signal from the photoelectric conversion elements corresponding to the other partial region excluding the partial region on the basis of the output signal from the photoelectric conversion elements corresponding to the partial region (region corresponding to the optical black portion) in the imaging element. Therefore, although the imaging element of the invention can be used in the imaging device without causing abnormality in the image information, when the imaging element is misappropriated and used in a state of ordinary use, abnormality is caused in the image information and, as a result, misappropriation of the imaging element can be prevented.

It is preferable for the setting portion to be a clamp circuit that sets the level of black by clamping the output signal from the photoelectric conversion elements corresponding to the partial region in the imaging element and adding the clamped signal to the output signal from the photoelectric conversion elements corresponding to the other partial region, and for the prohibition portion to adopt a configuration that prohibits, by prohibiting clamping by the clamp circuit, use by the setting portion of the output signal from the photoelectric conversion elements at which light is made incident via the opening.

The invention can be easily realized because prohibiting the clamping of the clamp circuit can be realized by an easy method such as stopping the action of the clamp circuit.

It should be noted that any shape can be adopted for the shape of the opening, such as a rectangular shape, a circular shape, or an oval shape. Also, the number of the openings is not limited to one, and may also be plural.

Moreover, the predetermined position can be a position that is different for each class of imaging element. Here, the model number and the serial number of the imaging element are included in the class. Thus, because the state of abnormality of the image information obtained when the imaging element is used in a state of ordinary use is different for each class of imaging element, the effect of deterring misappropriation of the imaging element can be raised even further.

According to a further aspect of the invention, there is provided an imaging element comprising: first photoelectric conversion elements for generating an image signal corresponding to an imaged subject; at least one shielded second photoelectric conversion element; and at least one third photoelectric conversion element that is not shielded and is disposed at a different position than the first photoelectric conversion elements.

According to a still further aspect of the invention, there is provided an imaging device comprising: the imaging element of the invention; and a reference signal setting portion that sets, as a reference signal, an output from the second photoelectric conversion element and does not set, as a reference signal, an output from the third photoelectric conversion element.

The imaging device of the invention can further include an image signal level adjustment portion that adjusts, on the basis of the reference signal, a level of an image signal outputted from the first photoelectric conversion elements.

The image signal level adjustment portion superposes the reference signal with the image signal outputted from the first photoelectric conversion elements. The reference signal is usually a black level.

It should be noted that plural second photoelectric conversion elements can be disposed, and that the third photoelectric conversion element may be positioned within a region comprising the plural second photoelectric conversion elements.

In this case, the plural second photoelectric conversion elements are shielded by a shielding member and the third photoelectric conversion element is disposed at a position corresponding to an opening formed in the shielding member. Plural third photoelectric conversion elements can be disposed.

The imaging device may also be configured so that the reference signal setting portion comprises a clamp circuit, which clamps an inputted output from the photoelectric conversion elements and outputs it as the reference signal, and a control portion, which controls the clamp circuit so that the output from the second photoelectric conversion element is clamped and the output from the third photoelectric conversion element is not clamped. In this case, the control portion is a timing generator.

The timing generator outputs a high-level signal with respect to the output from the second photoelectric conversion element and outputs a low-level signal with respect to the output from the third photoelectric conversion element.

Still further, it is an advantage of the invention to provide a method of deterring misappropriation of an imaging element, the method comprising: forming, on the imaging element, first photoelectric conversion elements for generating an image signal corresponding to an imaged subject, at least one shielded second photoelectric conversion element, and at least one third photoelectric conversion element that is not shielded and is disposed at a different position than the first photoelectric conversion elements; setting, as a reference signal, an output from the second photoelectric conversion element; and not setting, as a reference signal, an output from the third photoelectric conversion element.

DETAILED DESCRIPTION OF THE INVENTION

An embodiment of the invention will be described in detail below with reference to the drawings. It should be noted that, in the embodiment, description will be given of a case where an imaging element and an imaging device of the invention are applied to a digital camera. First, with reference to FIG. 1, the external configuration of a digital camera 10 pertaining to the embodiment will be described.

Figure 1:
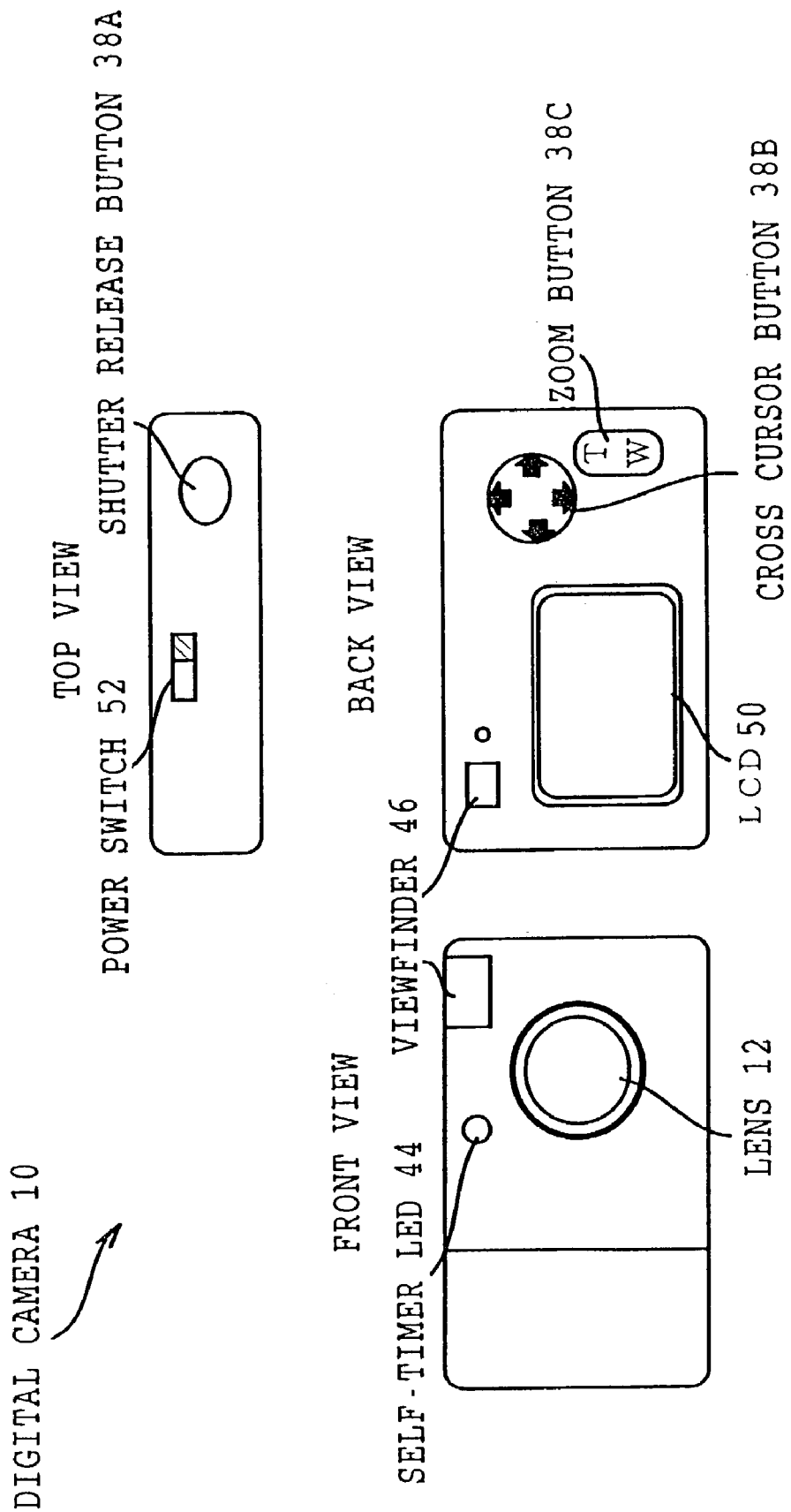
FIG. 1 is an outside drawing showing the exterior of a digital camera 10 pertaining to an embodiment of the invention.

As shown in FIG. 1, a front of the digital camera 10 is disposed with a lens 12 for imaging a subject image, a self-timer LED 44 for alerting a user, by flashing intervals, of the arrival of a shooting time when conducting shooting using a self-timer function, and a viewfinder 46 that is used for determining the composition of a subject that is to be shot. A top of the digital camera 10 is disposed with a shutter release button 38A, which is pressed by a user when implementing shooting, and a power switch 52.

The shutter release button 38A pertaining to the embodiment is configured so that two stages of pressing are detectable—a state in which the shutter release button 38A is pressed down to an intermediate position (pressed down halfway) and a state in which the shutter release button 38A is pressed down to a final pressing position past the intermediate position (pressed down completely).

Here, the digital camera 10 pertaining to the embodiment is configured so that shooting of still images and shooting of moving images can be conducted. When shooting of a still image is conducted, an automatic exposure (AE) function is activated by pressing the shutter release button 38A down halfway, the exposure state (state of shutter speed and aperture) is set, thereafter an auto focus (AF) function is activated and focus is controlled, and thereafter exposure (shooting) is conducted by completely pressing down the shutter release button 38A.

When shooting of a moving image is conducted, shooting of the moving image is initiated by completely pressing down the shutter release button 38A. After the shutter release button 38A is returned for a time to its unpressed position, shooting of the moving image is stopped by again completely pressing down the shutter release button 38A. In this manner, in the digital camera 10 pertaining to the embodiment, the shutter release button 38A is completely pressed down when initiating shooting of a moving image and is again completely pressed down when stopping the shooting. However, the invention is not limited thereto, and the shutter release button 38A can be configured to conduct shooting of a moving image during the period of time that it is completely pressed down.

A back of the digital camera 10 is disposed with an eyepiece of the viewfinder 46, a liquid crystal display (referred to below as an "LCD") 50 for displaying subject images represented by digital image data obtained by shooting, various types of menu screens, and messages, a cross cursor button 38B disposed with four arrow keys representing four directions of movement—up, down, left, right—in a display region of the LCD 50, and a zoom button 38C that is operated when zooming (magnifying and reducing) a subject image during shooting. It should be noted that the zoom button 38C is configured by a tele button, which corresponds to the "T" position in FIG. 1 and is operated to magnify a subject image, and a wide button, which corresponds to the "W" position in FIG. 1 and is operated to reduce a subject image.

Next, the configuration of an electrical system of the digital camera 10 pertaining to the embodiment will be described with reference to FIG. 2.

Figure 2:
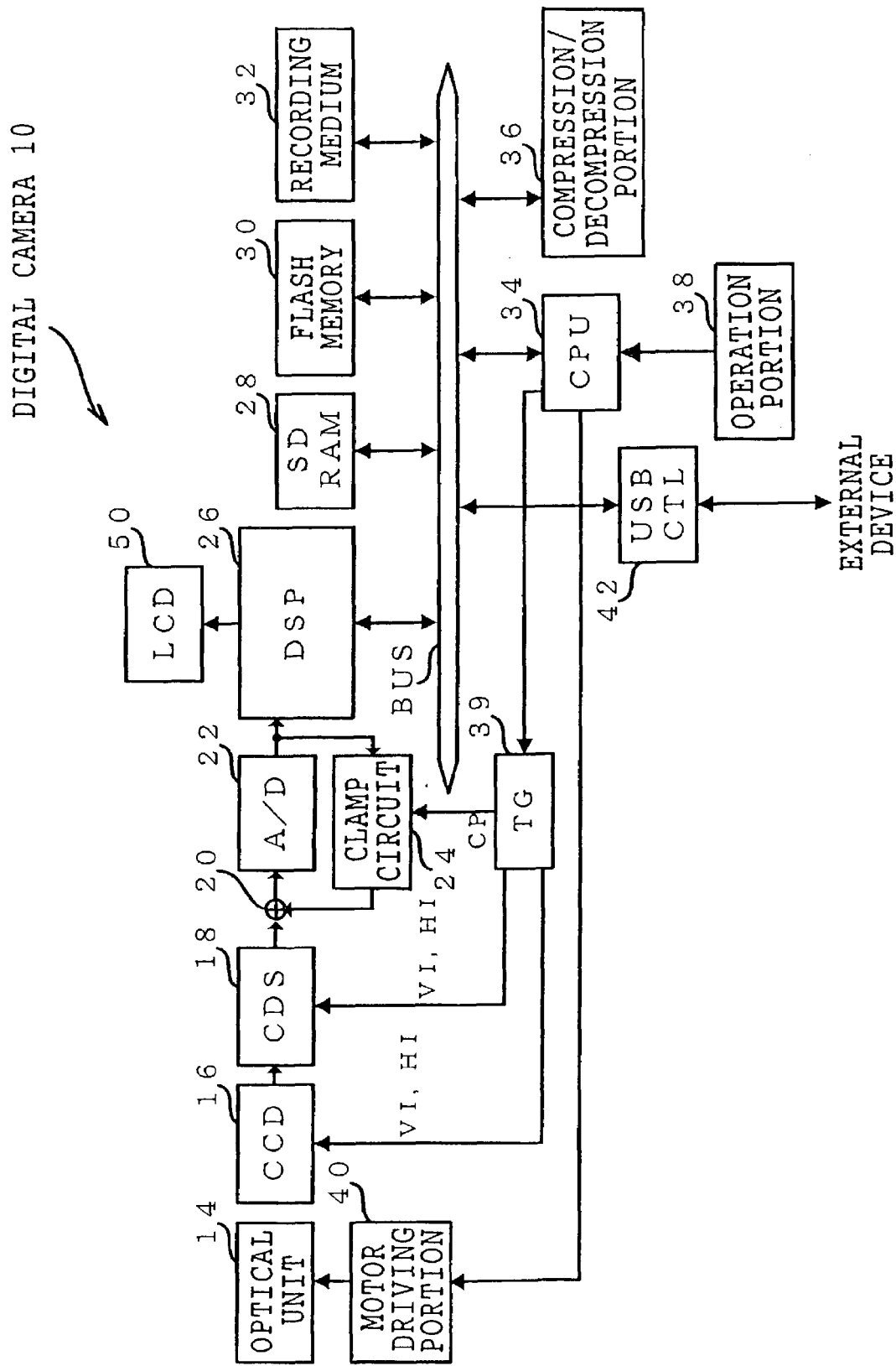
FIG. 2 is a block diagram showing the configuration of an electrical system of the digital camera 10 pertaining to the embodiment.

As shown in FIG. 2, the digital camera 10 includes an optical unit 14 that includes the lens 12, a charge coupled device (CCD) 16 disposed behind an optical axis of the lens 12, a correlation double sampling circuit (referred to below as a "CDS") 18, an adder 20 that superposes two inputted analog signals and outputs the signals as one analog signal, an analog/digital converter (referred to below as an "A/D converter") 22 that converts an inputted analog signal to digital data, and a clamp circuit 24.

Figure 5:
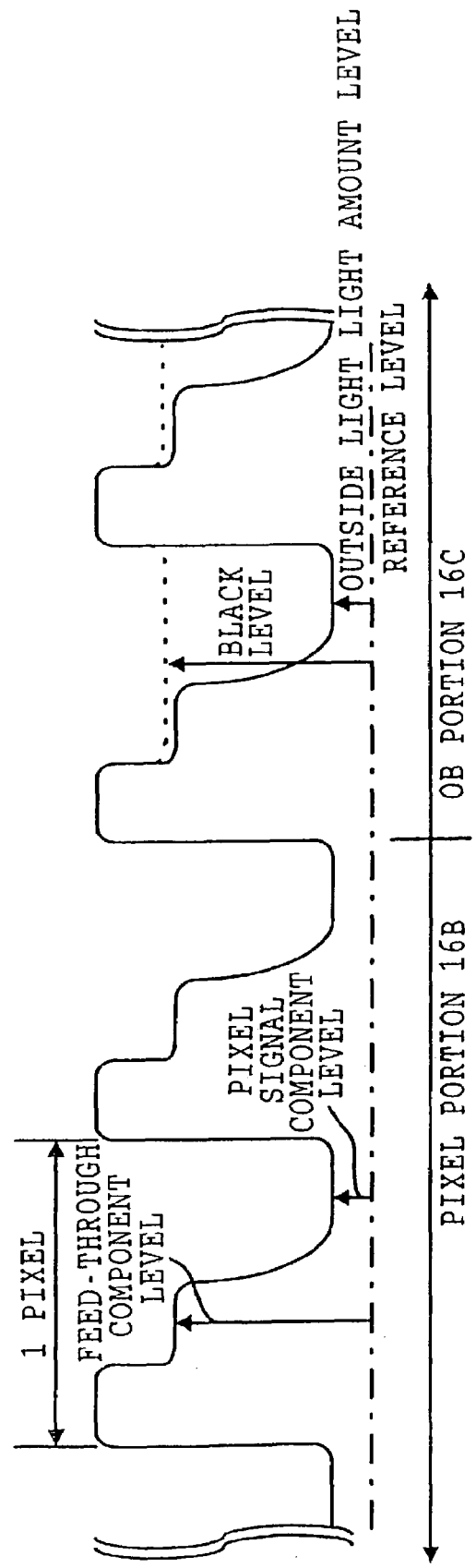
FIG. 5 is a wave form chart that shows an example of an output signal from the CCD 16 and is used to describe correlation double sampling processing and to describe the setting of a black level when an opening is disposed in an OB portion and when an opening is not disposed in the OB portion.

Here, correlation double sampling processing by the CDS 18 is processing that obtains accurate pixel data, such as shown in FIG. 5, by taking the difference between a feedthrough component level and a pixel signal component level included in a per-pixel output signal of a solid-state imaging element, with the purpose of reducing noise (particularly thermal noise) included in the output signal of the solid-state imaging element. The clamp circuit 24 converts inputted digital data to an analog signal, and clamps and maintains the signal level of the analog signal at a timing represented by a clamp signal CP described later.

Disposed in the digital camera 10 are a digital signal processor (DSP) 26, which houses a line buffer of a predetermined capacity, administers predetermined digital signal processing with respect to inputted digital data, and controls a display operation with respect to the LCD 50, a synchronous dynamic random access memory (SDRAM) 28 that mainly stores digital image data obtained by shooting, a Flash Memory 30 in which is stored in advance various types of programs and parameters, a central processing unit (CPU) 34 that controls the operations of the entire digital camera 10, and a compression/decompression portion 36 that administers compression processing with respect to digital image data by a predetermined compression format and administers decompression processing with respect to compressed digital image data.

It should be noted that, in the digital camera 10 pertaining to the embodiment, the JPEG (Joint Photographic Experts Group) format is used when compressing digital image data of a still image and the Motion JPEG format is used when compressing digital image data of a moving image as the predetermined compression formats.

An output terminal of the CCD 16 is connected to an input terminal of the CDS 18, an output terminal of the CDS 18 is connected to an input terminal of the adder 20, an output terminal of the adder 20 is connected to an input terminal of the A/D converter 22, an output terminal of the A/D converter 22 is connected to an input terminal of the DSP 26 and an input terminal of the clamp circuit 24, an output terminal of the DSP 20 is connected to an input terminal of the LCD 50, and an output terminal of the clamp circuit 24 is connected to another input terminal of the adder 20.

The DSP 26, the SDRAM 28, the Flash Memory 30, the CPU 34, and the compression/decompression portion 36 are interconnected by a bus. Therefore, the CPU 34 can optionally access the SDRAM 28 and the Flash Memory 30, and can control the actions of the DSP 26 and the compression/decompression portion 36.

It should be noted that the digital camera 10 pertaining to the embodiment is configured so that a portable recording medium 32, such as SmartMedia, an IC card, a CD-R, or a CD-RW, can be loaded therein. The recording medium 32 is electrically connected to the bus when it is loaded in the digital camera 10. Therefore, the CPU 34 can also optionally access the recording medium 32.

Moreover, the digital camera 10 is disposed with a timing generator (referred to below as a "TG") 39, whose input terminal is connected to the CPU 34 and whose output terminal is connected to the CCD 16, the CDS 18, and the clamp circuit 24.

The TG 39 has the role of generating, on the basis of a clock signal generated by an unillustrated liquid crystal oscillator, a vertical synch signal VI, which is a synch signal of a vertical direction of a system (imaging system) related to imaging by the CCD 16, a horizontal synch signal HI, which is a synch signal in a horizontal direction, and the clamp signal CP, supplying the vertical synch signal VI and the horizontal synch signal HI to the CCD 16 and the CDS 18, and supplying the clamp signal CP to the clamp circuit 24.

The various types of buttons and switches (collectively referred to as an "operation portion" in FIG. 2), such as the shutter release button 38A, the cross cursor button 38B, the zoom button 38C and the power switch 52, are connected to the CPU 34. Therefore, the CPU 34 can at all times grasp the operation status of these buttons and switches.

The CPU 34 is connected to an input terminal of a motor driving portion 40, and an output terminal of the motor driving portion 40 is connected to an unillustrated focus adjust motor and an unillustrated zoom motor disposed in the optical unit 14.

The lens 12 included in the optical unit 14 pertaining to the embodiment includes plural lenses, is configured as a zoom lens with which it is possible to change the focal length (change the magnification), and is disposed with an unillustrated lens drive mechanism. The zoom motor and the focus adjust motor are included in the lens drive mechanism and are respectively driven by a drive signal supplied from the motor driving portion 40 under the control of the CPU 34.

When changing the optical zoom magnification, the CPU 34 controls the drive of the zoom motor and changes the focal length of the lens included in the optical unit 14.

The CPU 34 also conducts focus control by controlling the drive of the focus adjust motor so that the contrast of an image obtained by imaging by the CCD 16 becomes a maximum. That is, the digital camera 10 pertaining to the embodiment adopts, as the focus control, the so-called TTL (Through The Lens) system that sets the position of the lens so that the contrast of the read image becomes a maximum.

A USB (Universal Serial Bus) controller 42, which is connected to the bus, is housed in the digital camera 10. The USB controller 42 can be connected to an external device, such as a personal computer or a PDA (Personal Digital Assistant), via an unillustrated connector.

Figure 3:
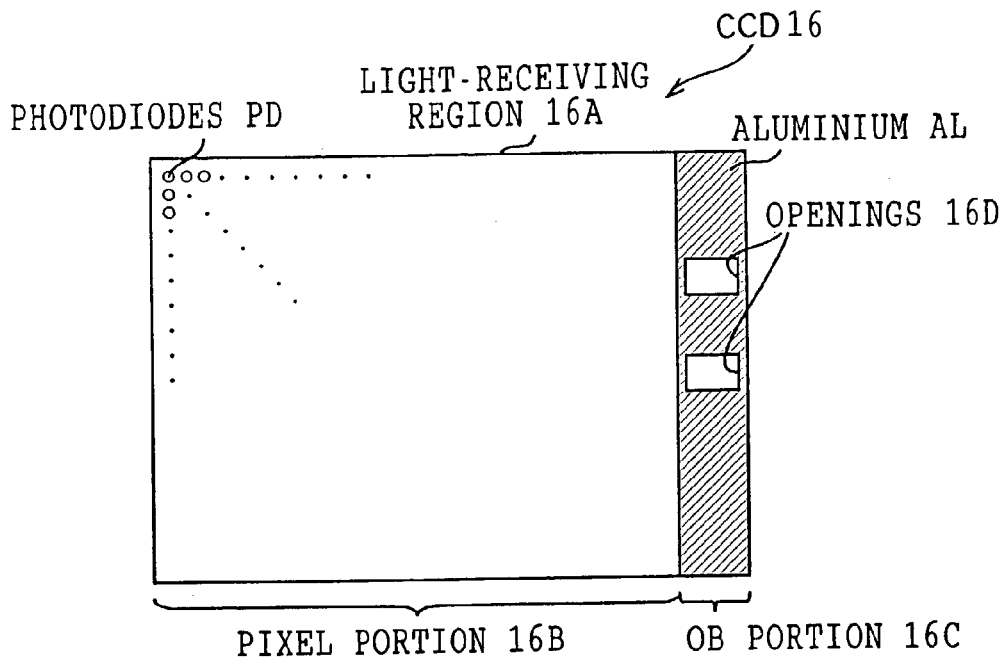
FIG. 3 is a pattern diagram showing the configuration of a light-receiving region of a CCD 16 pertaining to the embodiment.

Next, with reference to FIG. 3, the configuration of the CCD 16 will be described in detail. As shown in FIG. 3, the CCD 16 pertaining to the embodiment is an area CCD in which numerous photodiodes PD are arranged in a two-dimensional matrix in row directions (left-right direction in the drawing) and column directions (top-bottom direction in the drawing) across an entire light-receiving region 16A.

An optical black portion (referred to below as an "OB portion") 16C, which is a shielding portion for determining an output level when an imaged image is black, is disposed at a partial region (in the embodiment, a right-end region in the row direction of the photodiodes PD) of the light-receiving region 16A. That is, the light-receiving region 16A comprises the two regions of the OB portion 16C and a pixel portion 16B, which is a region not shielded by the OB portion 16C and in which the photodiode PD group outputting a signal representing an imaged image is disposed.

The OB portion 16C covers (masks), with aluminium AL, surface portions of all of the photodiodes PD positioned at the position at which the OB portion 16C is disposed.

Although such a CCD in which a shielding OB portion is disposed across the entire partial region of the light-receiving region has conventionally been widely used, in the CCD 16 pertaining to the embodiment, openings 16D for guiding light to the photodiodes PD are disposed at predetermined positions in the OB portion 16C.

Thus, as shown in FIG. 5, although the signal level (the level represented by the broken line in the drawing) of an output signal from the photodiodes PD corresponding to the OB portion 16C in which the openings 16C are not disposed becomes a normal black level, the signal level of an output signal from the photodiodes at which light guided by the openings 16D is made incident becomes a light amount level of outside light, which is an abnormal level that cannot be used to set the black level. Here, the openings 16D can be formed by not masking the surface portions of the photodiodes PD positioned at the positions at which the openings 16D are disposed.

When the manufacturer of the CCD 16 is different from the manufacturer of the digital camera 10, the manufacturer of the CCD 16 presents information representing the positions of the openings 16D disposed in the OB portion 16C of the CCD 16 to the manufacturer of the digital camera 10. Thus, the manufacturer of the digital camera 10 can grasp, prior to manufacturing the digital camera 10, the positions at which the openings 16D are disposed in the CCD 16.

In the embodiment, as shown as an example in Table 1, the positions at which the openings are disposed differ for each class (here, model number) of CCD.

TABLE 1

| Model Number | Opening Position Information (Column Position) |
| --- | --- |
| AAAA | 320-330, 540-560 |
| BBBB | 210-220, 780-800 |
| . | . |
| . | . |
| . | . |

In Table 1, in the case of, for example, the CCD whose model number is "AAAA", the information represents the fact that the openings are disposed at two positions—a position from the photodiodes of column 320 to column 330, and a position from the photodiodes of column 540 to 560—in the OB portion.

Therefore, the manufacturer of the digital camera 10 pertaining to the embodiment grasps in advance the positions at which the openings are disposed for each class of handled CCD, and prepares in advance data of the kind shown in Table 1.

Figure 4A:
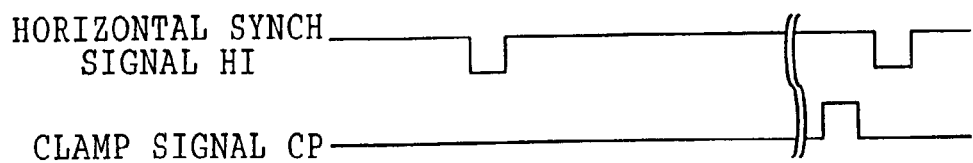
FIGS. 4A and 4B are time charts used to describe a clamp signal CP supplied to a clamp circuit 24 pertaining to the embodiment.
Figure 4B:
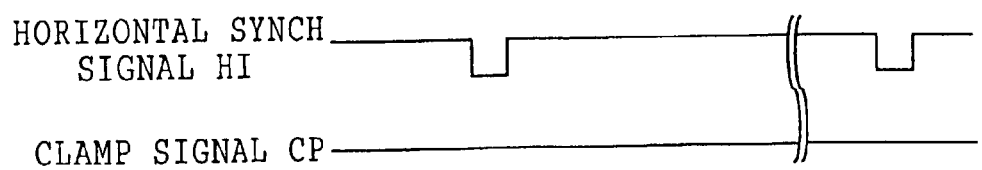

The manufacturer of the digital camera 10 sets, on the basis of the opening position information corresponding to the model number of the CCD 16 used in the digital camera 10, the TG 39 so that the clamp signal CP outputted from the TG 39 to the clamp circuit 24 becomes the states shown in FIGS. 4A and 4B. It should be noted that the clamp signal CP pertaining to the embodiment is a signal that makes the clamp circuit 24 to conduct a clamping operation of an input signal when the level is high, and to maintain the clamped input signal as an output signal when the level is low.

That is, as shown in FIG. 4A, the level of the clamp signal CP corresponding to a read timing of an output signal from the photodiode PD columns corresponding to the positions at which the openings 16D are not disposed rises to the high level at the read timing of the output signal of the photodiode PD positioned in the OB portion 16C synchronously with the horizontal synch signal HI.

Thus, the clamp circuit 24 clamps the output signal from the photodiodes PD that are positioned in the OB portion 16C and are shielded and maintains the clamped output signal at the read timing of the output signal from the next photodiode PD column. Thus, the output signal from the next photodiode PD column is superposed on the clamped output signal by the adder 20, whereby the level of black in the output signal from the photodiode PD column can be properly set.

With respect thereto, the clamp signal CP corresponding to the read timing of the output signal from the photodiode PD columns corresponding to the positions at which the openings 16D are disposed is configured so as not to disposed a period of a high level synchronized with the horizontal synch signal HI, as shown in FIG. 4B.

Thus, in the clamp circuit 24, the clamping operation of the output signal from the photodiodes PD that are positioned in the OB portion 16 and shielded is not conducted, whereby the output signal clamped at the point in time closest to that point in time is continuously maintained at the read timing of the output signal from the photodiode PD columns from there on. Therefore, the output signal from the photodiode PD columns is superposed by the adder 40 with the output signal maintained in the clamp circuit 24, whereby the level of black in the output signal from the photodiode PD column can be properly set.

The photodiodes PD correspond to the photoelectric conversion elements of the invention, the aluminium AL corresponds to the shielding member of the invention, the CCD 16 corresponds to the imaging element of the invention, the openings 16D correspond to the openings of the invention, the clamp circuit 24 corresponds to the setting portion of the invention, and the TG 39 corresponds to the prohibition portion of the invention.

Next, the action of the digital camera 10 pertaining to the embodiment during shooting will be described. When the power switch 52 is switched on and an unillustrated lens cover is removed from the lens 12, the TG 39 initiates supply of the vertical synch signal VI and the horizontal synch signal HI to the CCD 16 and the CDS 18 under the control of the CPU 34, and initiates supply of the clamp signal CP to the clamp circuit 24.

The CCD 16 successively outputs, at a timing corresponding to the vertical synch signal VI and the horizontal synch signal HI inputted from the TG 39, an analog signal (signal shown in FIG. 5 as an example) representing a subject image to the CDS 18.

The CDS 18 takes the difference between the pixel signal component level and the feed-through component level included in the analog signal inputted from the CCD 16, per pixel at the timing corresponding to the vertical synch signal VI and the horizontal synch signal HI, and successively outputs it as an analog image signal to the A/D converter 22 via the adder 20.

The A/D converter 22 converts the R (red), G (green) and B (blue) analog image signals inputted from the CDS 18 via the adder 20 into R, G and B signals of 12 bits (referred to below as "digital image data") and outputs the signals to the clamp circuit 24 and the DSP 26.

The clamp circuit 24 restores the digital image data inputted from the A/D converter 22 to analog image signals using an unillustrated digital/analog converter, clamps the signal level of the analog image signals when the clamp signal CP inputted from the TG 39 is a high level, and maintains the clamped signal level when the clamp signal CP is a low level and supplies the analog image signals to the adder 20. Therefore, only the signal level of the output signal from the photodiodes PD positioned in the shielded region of the OB portion 16C is used to set the black level of the output signal from the photodiodes positioned in the pixel portion 16B. As a result, digital image data whose black level has been properly corrected is inputted to the DSP 26.

It should be noted that, when a party other than the manufacturer of the digital camera improperly removes and misappropriates the CCD 16 used in the digital camera 10, the output signal from the photodiodes PD at which light is made incident by the openings 16D disposed in the CCD 16 is also used to set the black level of the image information, whereby proper digital image data cannot be obtained. Thus, misappropriation of the CCD 16 can be prevented.

The DSP 26 accumulates, in the housed line buffer, the digital image data successively inputted from the A/D converter 22, and temporarily stores the digital image data in the SDRAM 28.

The digital image data stored in the SDRAM 28 is read by the CPU 34, white balance adjustment is conducted by applying to this data a digital gain in accordance with the type of light source, gamma processing and sharpness processing is conducted to generate 8-bit digital image data, YC signal processing is administered to generate a luminance signal Y and chroma signals Cr and Cb (referred to below as "YC signals"), and the YC signals are again stored in the SDRAM 28.

It should be noted that, although the LCD 50 is configured by a display that displays a moving image (through image) obtained by continuous imaging by the CCD 16 and can be used as a viewfinder, when the LCD 50 is used as a viewfinder in this manner, the generated YC signals are successively outputted to the LCD 50 via the DSP 26. Thus, a through image is displayed on the LCD 50.

Here, when imaging of a still image is set by an unillustrated shooting mode setting switch, when the shutter release button 38A is completely pressed down by the shooter, the YC signals stored in the SDRAM 28 at this point in time are recorded as an image file in the recording medium 32 after being compressed in a predetermined compression format (in the embodiment, the JPEG format) by the compression/decompression portion 36.

When imaging of a moving image is set by the shooting mode setting switch, the YS signals stored in the SDRAM 28 are recorded as an image file in the recording medium 32 after being compressed in a predetermined compression format (in the embodiment, the Motion JPEG format) by the compression/decompression portion 36 per predetermined period (in the embodiment, 1/30 second (0.033 . . . seconds)) in a period from the point in time that the shutter release button 38A is completely pressed down to the next point in time that the shutter release button 38A is completely pressed down, i.e., the period during which shooting of the moving image is being conducted. Therefore, when shooting of a moving image has been conducted with the digital camera 10 pertaining to the embodiment, a moving image of 30 frames/second can be recorded in the recording medium 32.

As described in detail above, because the CCD 16 pertaining to the embodiment is disposed with the plural photodiodes PD for breaking down an image into plural pixels to generate image information representing the image, the shielding member that shields a partial region (OB portion 16C) of the light-receiving region 16A by the plural photodiodes PD in order to determine the output level when the image is black, and the openings 16D for guiding light to the photodiodes PD at predetermined positions in the shielding member, the CCD 16 can make image information whose black level is set on the basis of the output signal from the photodiodes PD into abnormal image information in the state of ordinary use. As a result, the CCD 16 can prevent misappropriation by a third party.

In the CCD 16 pertaining to the embodiment, because the predetermined positions are determined as positions that differ for each class of CCD, the abnormal state of image information obtained when the CCD 16 is used in the state of ordinary use becomes different for each class of CCD. As a result, the effect of deterring misappropriation of the CCD 16 can be raised even further.

Although the digital camera 10 can use the CCD 16 without causing abnormality in the image information because the digital camera 10 pertaining to the embodiment is disposed with the CCD 16 and prohibits use of the output signal from the photodiodes PD at which light is made incident via the openings 16D disposed in the shielding member when setting the level of black of the output signal from the photodiodes PD corresponding to the pixel portion 16B on the basis of the output signal from the photodiodes PD corresponding to the OB portion 16C in the CCD 16, when the CCD 16 is misappropriated and the digital camera 10 is used in the state of ordinary use, abnormality is caused in the image information and, as a result, misappropriation of the CCD 16 can be prevented.

Moreover, the invention can easily be realized because the digital camera 10 adopts a configuration in which the clamp circuit 24, which sets the level of black by clamping the output signal from the photodiodes PD corresponding to the OB portion 16C and adding it to the output signal from the photodiodes PD corresponding to the pixel portion 16B, is used as the setting portion of the invention and the TG 39 prohibits, by using the clamp signal CP to prohibit clamping by the clamp circuit 24, use by the clamp circuit 24 of the output signal from the photodiodes PD at which light is made incident with the openings 16D.

It should be noted that, although description was given in the embodiment of a case where the shapes of the openings 16D were rectangular, the invention is not limited thereto. As long as the shapes of the openings 16D are shapes that can guide light to the photodiodes PD corresponding to predetermined positions in the OB portion 16C, any shape can be used. In this case also, the same effects as those of the embodiment can be provided.

Figure 6A:
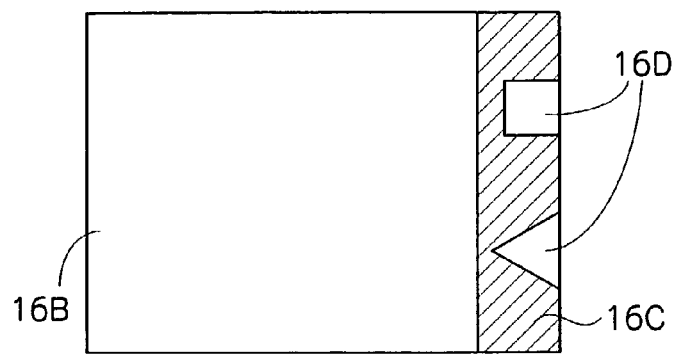
FIGS. 6A to 6D show examples of the opening.
Figure 6B:
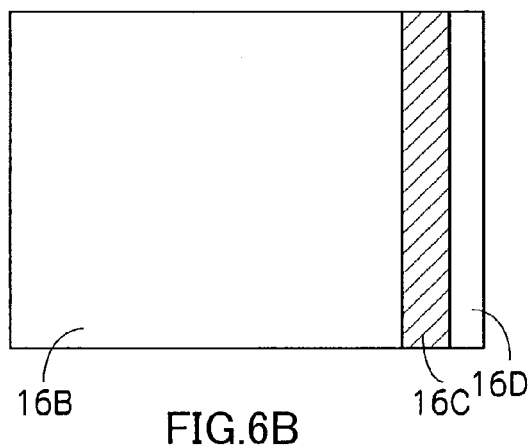
Figure 6C:
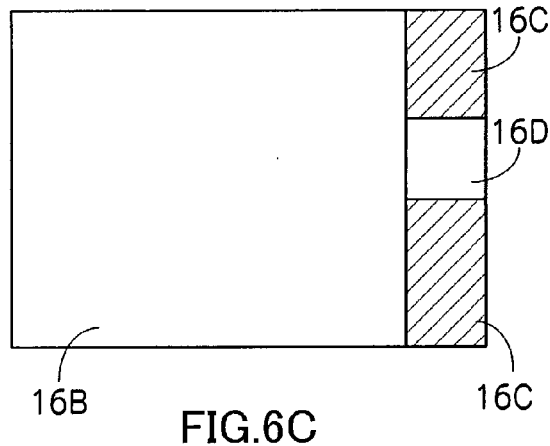

Additionally, although a case was described where the openings 16D were disposed within the region of the OB portion 16C, the invention is not limited to this kind of disposition. For example, as shown in FIG. 6A, the openings 16D may be disposed as cutouts of the OB portion 16C. Also, as shown in FIGS. 6B and 6C, part of the region other than the pixel portion 16B, which is a region in which photodiodes that output the image signal corresponding to the imaged subject are disposed, may be shielded and formed as the OB portion 16C, and the remaining portion may be formed as the opening 16D.

Figure 6D:
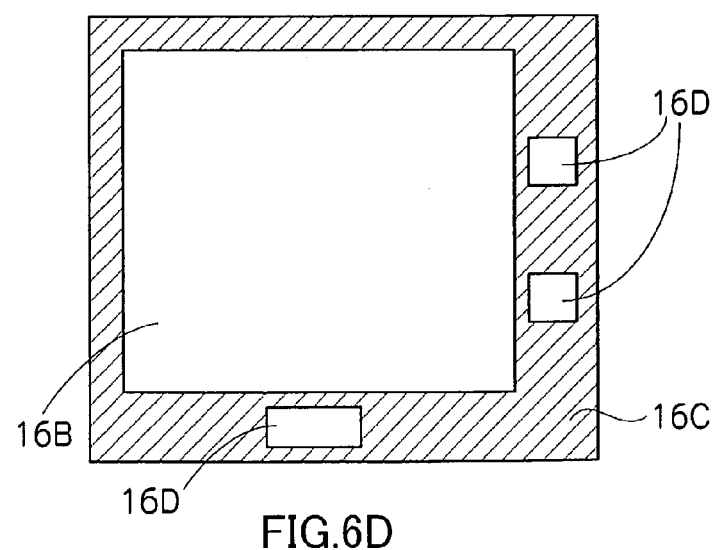

Although, as shown in FIG. 3, an example was described in which the OB portion 16C was disposed in the vertical direction and the black level was set per horizontal line, the invention is not limited thereto. For example, as shown in FIG. 6D, in addition to a vertical-direction OB portion, the OB portion and the openings 16D may also be disposed in the horizontal direction. Also, only a horizontal-direction OB portion and openings may be disposed.

Although description was given in the embodiment of a case where an area CCD was used as the imaging element of the invention, the invention is not limited thereto. The invention can also be configured to use a line CCD (linear CCD). In this case also, effects that are the same as those of the embodiment can be provided.

Additionally, although description was given in the embodiment of a case where the OB portion 16C was formed by masking surface portions of the photodiodes PD with aluminum Al, the invention is not limited thereto. The OB portion can also be formed by masking with another member. In this case also, effects that are the same as those of the embodiment can be provided.

According to the imaging element of the invention, the imaging element is disposed with plural photoelectric conversion elements for breaking down an image into plural pixels to generate image information representing the image, and a shielding member that shields a partial region of a light-receiving region corresponding to the plural photoelectric conversion elements in order to determine an output level when the image is black, with an opening for guiding light to the photoelectric conversion elements being disposed at a predetermined position in the shielding member. Thus, the effect is obtained that the image information, whose level of black is set on the basis of the output signal from the photoelectric conversion elements, can be made abnormal in a state of ordinary use and, as a result, misappropriation by a third party can be prevented.

Also, according to the imaging device of the invention, the imaging device is disposed with the imaging element of the invention, the setting portion for setting, on the basis of the output signal from the photoelectric conversion elements corresponding to the partial region in the imaging element, the level of black of the output signal from the photoelectric conversion elements corresponding to the other partial region excluding the partial region, and the prohibition portion that prohibits use by the setting portion of the output signal from the photoelectric conversion elements at which light is made incident via the opening disposed in the shielding member. Thus, the effect is obtained that, although the imaging element of the invention can be used in the imaging device without causing abnormality in the image information, when the imaging element is misappropriated and used in a state of ordinary use, abnormality is caused in the image information and, as a result, misappropriation by a third party can be prevented.

What is claimed is:

1. An imaging device comprising:
   an imaging element comprising:
      plural photoelectric conversion elements for breaking down an image into plural pixels to generate image information representing the image; and
      a shielding member that shields a partial region of a light-receiving region corresponding to the plural photoelectric conversion elements in order to determine an output level when the image is black,
      wherein an opening for guiding light to the photoelectric conversion elements is disposed at a predetermined position in the shielding member;
   a setting portion for setting, on the basis of an output signal from the photoelectric conversion elements corresponding to the partial region in the imaging element, a level of black of an output signal from the photoelectric conversion elements corresponding to another partial region excluding the partial region; and
   a prohibition portion that prohibits use by the setting of an output signal from the photoelectric conversion elements at which light is made incident via the opening disposed in the shielding member.

2. The imaging device of claim 1, wherein
   the setting portion is a clamp circuit that sets the level of black by clamping the output signal from the photoelectric conversion elements corresponding to the partial region in the imaging element and adding the clamped signal to the output signal from the photoelectric conversion elements corresponding to the other partial region, and
   the prohibition portion prohibits, by prohibiting clamping by the clamp circuit, use by the setting portion of the output signal from the photoelectric conversion elements at which light is made incident via the opening.

3. The imaging device of claim 1, wherein said imaging element corresponds to a predetermined class of a plurality of classes, and
   wherein said predetermined position is different depending on said predetermined class of said plurality of classes.

4. A method of deterring misappropriation of an imaging element, the method comprising:
   forming, on the imaging element, first photoelectric conversion elements for generating an image signal corresponding to an imaged subject, at least one shielded second photoelectric conversion element, and at least one third photoelectric conversion element that is not shielded and is disposed at a different position than the first photoelectric conversion elements;
   setting, as a reference signal, an output from the at least one shielded second photoelectric conversion element;
   not setting, as a reference signal, an output from the at least one third photoelectric conversion element; and
   prohibiting use of the output from the at least one third photoelectric conversion element.

5. The method of claim 4, further comprising:
   setting a level of black by clamping the output from the at least one shielded second photoelectric conversion element in the imaging element, and adding the clamped signal to the output from the at least one third photoelectric conversion element,
   wherein said prohibiting comprises prohibiting the use of the output from the at least one third photoelectric conversion element by prohibiting clamping of the output of the at least one third photoelectric conversion.

6. The method of claim 4, wherein said forming, on the imaging element, said at least one third photoelectric conversion element that is not shielded and is disposed at said different position than the first photoelectric conversion elements, comprises:
   forming said at least one third photoelectric conversion element at a predetermined position based on a corresponding predetermined class of a plurality of classes of said imaging element.

7. An imaging device, comprising:
   an imaging element comprising:
      first photoelectric conversion elements for generating an image signal corresponding to an imaged subject;
      at least one shielded second photoelectric conversion element; and
      at least one third photoelectric conversion element that is not shielded and is disposed at a different position than the first photoelectric conversion elements,
      wherein said different position of said at least one third photoelectric conversion element depends on a predetermined class of a plurality of classes; and
   a reference signal setting portion that sets, as a reference signal, an output from the second photoelectric conversion element and does not set, as a reference signal, an output from the third photoelectric conversion element, said reference signal setting portion comprising:
      a clamp circuit that sets a level of black by clamping the output from the at least one shielded second photoelectric conversion element in the imaging element, and adds the clamped signal to the output from the at least one third photoelectric conversion element; and
      a prohibition portion that prohibits clamping by the clamp circuit to thereby prohibit use by the reference signal setting portion of the output from the at least one third photoelectric conversion element.

8. The imaging device of claim 7, further including an image signal level adjustment portion that adjusts, on the basis of the reference signal, a level of an image signal outputted from the first photoelectric conversion elements.

9. The imaging device of claim 8, wherein the image signal level adjustment portion superposes the reference signal with the image signal outputted from the first photoelectric conversion elements.

10. The imaging device of claim 7, wherein the reference signal is a black level.

11. The imaging element of claim 7, wherein plural second photoelectric conversion elements are disposed.

12. The imaging element of claim 11, wherein the third photoelectric conversion element is positioned within a region comprising the plural second photoelectric conversion elements.

13. The imaging element of claim 12, wherein the plural second photoelectric conversion elements are shielded by a shielding member and the third photoelectric conversion element is disposed at a position corresponding to an opening formed in the shielding member.

14. The imaging element of claim 7, wherein plural third photoelectric conversion elements are disposed.

15. The imaging device of claim 7, wherein the reference signal setting portion comprises
   a clamp circuit that clamps an output from the photoelectric conversion elements and outputs it as the reference signal, and
   a control portion that controls the clamp circuit so that the output from the second photoelectric conversion element is clamped and the output from the third photoelectric conversion element is not clamped.

16. The imaging device of claim 15, wherein the control portion is a timing generator.

17. The imaging device of claim 16, wherein the timing generator outputs a high-level signal with respect to the output from the second photoelectric conversion element and outputs a low-level signal with respect to the output from the third photoelectric conversion element.

* * * * *